(12) United States Patent
Schwartz et al.

(10) Patent No.: US 7,293,574 B2
(45) Date of Patent: Nov. 13, 2007

(54) GAS CYLINDER REGULATOR

(75) Inventors: Mary K. Schwartz, Delano, MN (US); Keith Monson, Ramsey, MN (US)

(73) Assignee: Tescom Corporation, Elk River, MN (US)

( * ) Notice: Subject to any disclaimer, the term of this patent is extended or adjusted under 35 U.S.C. 154(b) by 269 days.

(21) Appl. No.: 11/107,113

(22) Filed: Apr. 15, 2005

(65) Prior Publication Data
US 2006/0231142 A1   Oct. 19, 2006

(51) Int. Cl.
*G05D 16/10* (2006.01)
*F16K 17/16* (2006.01)

(52) U.S. Cl. ............... 137/68.19; 137/505.25

(58) Field of Classification Search ............. 137/68.19, 137/318, 505.25, 505.28
See application file for complete search history.

(56) References Cited

U.S. PATENT DOCUMENTS

| | | | |
|---|---|---|---|
| 4,694,850 A | * | 9/1987 | Fumino ...................... 137/318 |
| 4,898,205 A | * | 2/1990 | Ross ...................... 137/505.12 |
| 5,894,869 A | * | 4/1999 | Mussack ...................... 141/19 |
| 6,056,006 A | | 5/2000 | Hagerty |
| 6,155,258 A | | 12/2000 | Voege |
| 6,517,615 B2 | * | 2/2003 | Miller et al. ................... 96/421 |
| 6,615,865 B1 | | 9/2003 | Eusebi |

\* cited by examiner

*Primary Examiner*—Stephen M. Hepperle
(74) *Attorney, Agent, or Firm*—Marshall, Gerstein & Borun LLP

(57) ABSTRACT

The pressure regulator is threadable onto the neck of a tank of gas under pressure that has a plug mounted in the neck and a rupturable disk blocking fluid flow through a plug bore. The main body includes a central reduced diameter portion extendable into the plug bore without rupturing the disk when the regulator is threaded to the neck, but when further threaded, ruptures the disk. The combination of the main body and a cap have a bore extending therethrough which opens to the tank interior when the disk is ruptured and to the regulator outlet. A piston is mounted in the body and cap bore that blocks fluid flow through the last mentioned bore when the pressure at the outlet is at or above a preselected level but permits flow therethrough when the outlet pressure is below the preselected level.

15 Claims, 3 Drawing Sheets

GAS CYLINDER REGULATOR

BACKGROUND OF THE INVENTION

This invention is for a pressure reducing regulator for cylinders or tanks containing gas under high pressure in liquid or gaseous form.

At the present time gas, for example liquid carbon dioxide, is sold in cylinders having plugs mounted in the necks of the cylinders. The plugs having bores extending axially therethrough with there being rupture disks mounted by the lower end portions of the plugs to block fluid flow from the cylinders escaping through the plug bores until the disk is ruptured.

In U.S. Pat. No. 6,056,006 to Hagerty there is disclosed a pressure regulator having a piston disposed between the low pressure outlet and the high pressure inlet and is resiliently urged to permit fluid flow from the inlet to the outlet. Further, there are a pair of ports that open to the high pressure passage between the high pressure inlet and the valve seat. It is stated in column 2, lines 17, 18 the ports "may be plugged or used for a pressure gauge or the like, as is commonly known in the art."

U.S. Pat. No. 6,155,258 to Voege discloses a regulator having ports between a valve seat and an inlet and a piston which is resiliently urged to an open position disposed between an inlet and an outlet. In column 4, lines 18, 19 it is indicated a pressure gauge and a check valve or a Schrader valve may be provided in the ports. In U.S. Pat. No. 6,615,865 to Eusebi there is disclosed a valve for high pressure gas cylinders wherein a pressure relief device is provided to break in the event the pressure in the high pressure inlet exceeds a preselected value.

In order to make improvements in pressure regulators, particularly for those high pressure gas cylinders, this invention has been made.

SUMMARY OF THE INVENTION

The pressure reducing regulator includes a regulator body that, together with a cap or bonnet, form a control chamber having a piston therein. The piston has a bore extending axially therethrough and is resiliently urged to permit flow from the inlet to the top portion of the control chamber while, when the pressure in the top portion decreases below a preselected value, the piston moves to an open position to increase the pressure above the piston. The main body has a downwardly opening annular portion that is threadable to the neck of the cylinder to have the neck extend thereinto and a reduced diameter portion that extends downwardly further than the annular portion that will rupture the seal disk in the neck to permit fluid flow from the cylinder. The main body has a lower annular chamber that in part is defined by the annular portion and the reduced diameter portion. Further, the main body has a vent aperture that opens to lower annular chamber and is blocked by the cylinder neck prior to the main body being threaded to rupture the seal disk.

One of the objects of this invention is to provide a pressure reducing regulator having new and novel means for being threaded to the neck of a high pressure fluid cylinder and rupture a disk seal in the cylinder neck. In furtherance of the above object it is another object of this invention to provide a pressure regulator having novel means to provide a signal that there is still fluid under substantial pressure in the cylinder while the regulator is being unthreaded from the cylinder but prior to the regulator being disconnected from the cylinder.

Even though, for convenience terms, such as "upper", "lower", "top" and "bottom" will be used in describing the pressure regulator, it is to be understood the usage of these terms is applicable to when the pressure regulator is in an upright position such as illustrated. However, it is to be further understood that the pressure regulator may be used in other than an upright position.

DESCRIPTION OF THE PREFERRED EMBODIMENT

Figure 1:
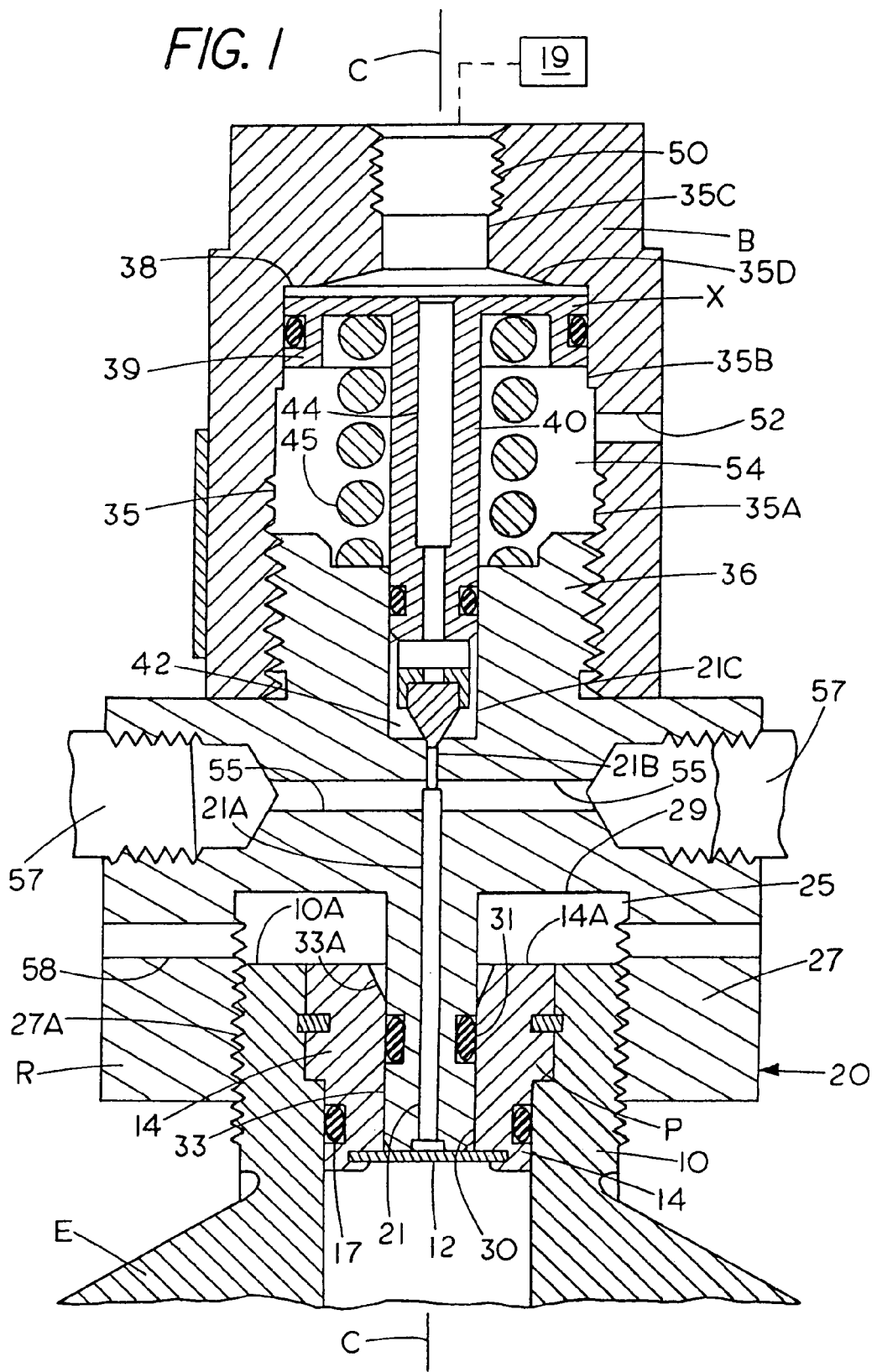
FIG. 1 is a cross sectional view of the pressure regulator threaded to a cylinder prior to rupturing the cylinder seal with the pressure relief device being only partially illustrated.
Figure 2:
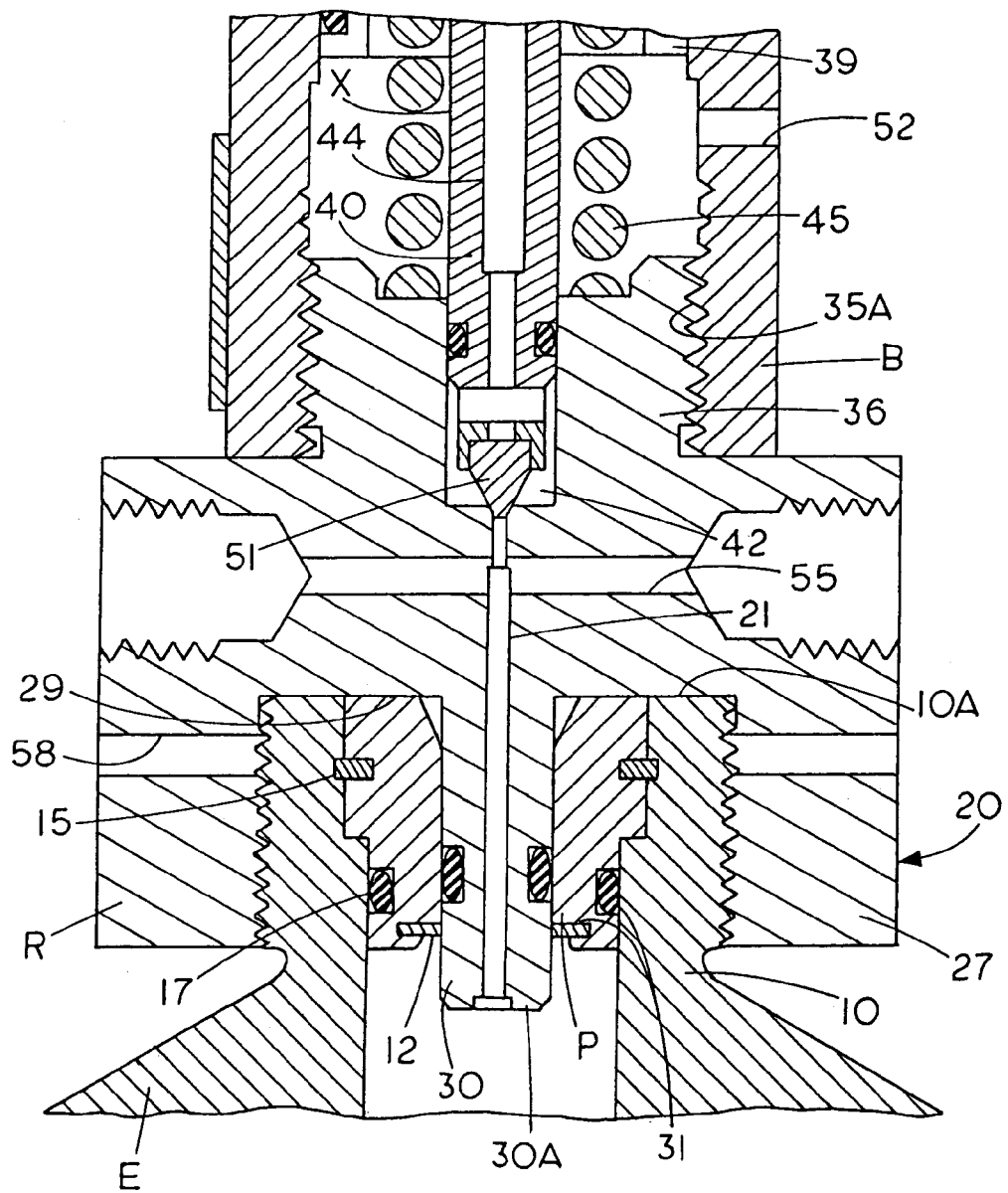
FIG. 2 is a view of a portion of FIG. 1 other than the regulator is fully threaded to the gas cylinder.
Figure 3:
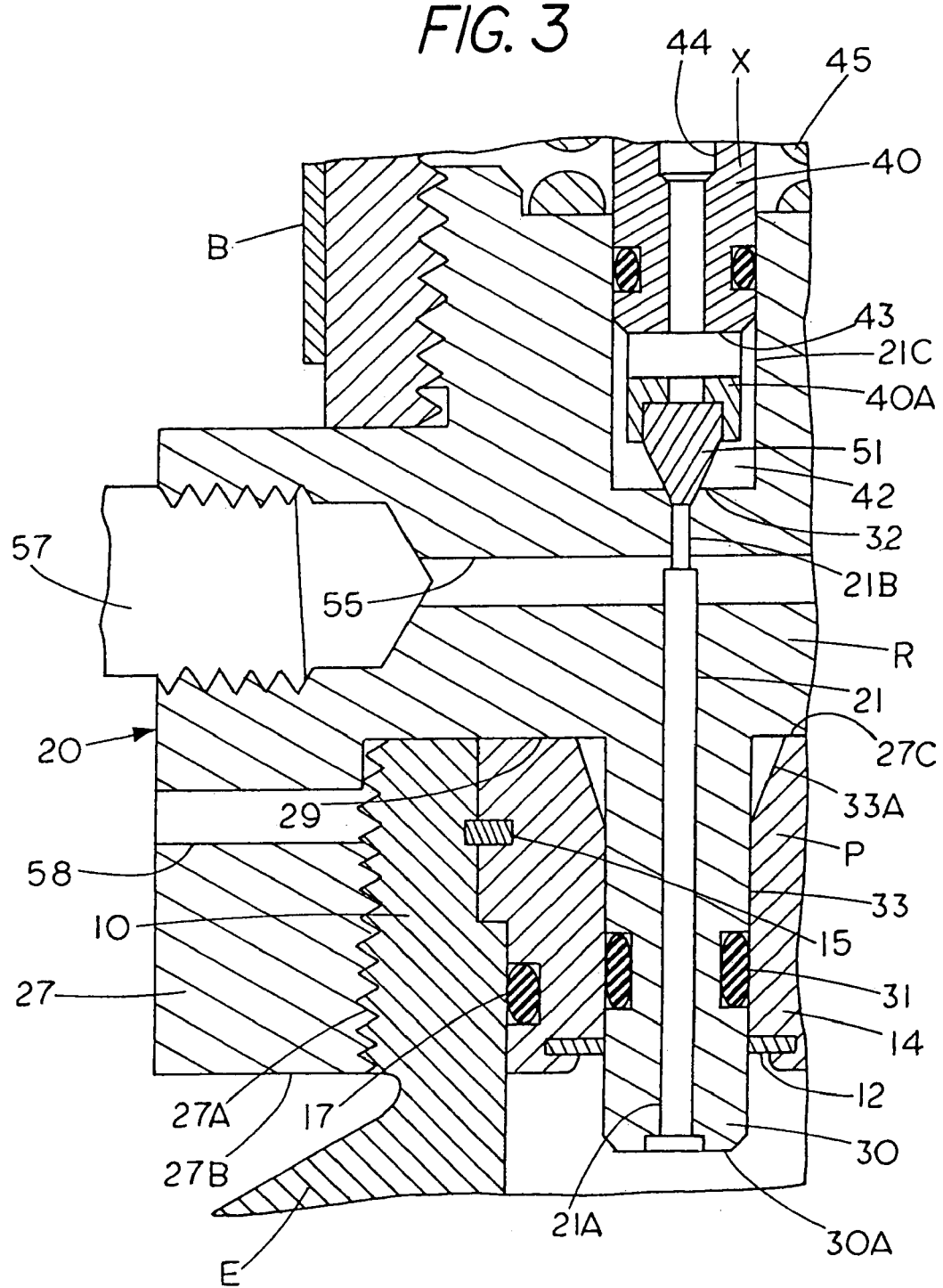
FIG. 3 is an enlarged fragmentary portion of FIG. 2.

Referring to FIGS. 1 and 2 of the drawings, the regulator R of this invention, which has a central axis C-C, is particularly usable for cylinders E having externally threaded necks 10 for containing fluids under high pressure and conventional plug devices P in the cylinder necks 10 for blocking the escape of fluids from the cylinders or tanks until the disks 12 are ruptured. That is, such a plug device includes a plug 14 having an aperture 33 extending axially therethrough with there being a rupturable seal disk 12 crimped to the lower part of the plug to block the escape of fluid from the cylinder through the plug aperture until the disk is ruptured. A clip ring 15 extends in an annular groove in the plug and the internal wall portion of the neck to retain the plug device in the cylinder neck while a seal ring 17, for example an O-ring, is provided in a groove in the plug to form a fluid seal with the neck. The top annular surface 14A of the plug is at or below the top annular surface 10A of the neck.

The regulator R includes a main body, generally designated 20, having a bore 21 extending axially therethrough. The main body has a lower, downwardly opening, annular chamber 25 that is in part defined by a top wall 29; a radially outer annular portion 27 extending below the top wall 29 and providing an internally threaded bore portion 27A which is adapted to be threaded to the cylinder (tank) neck 10 with the annular top wall 29 being abuttable against the top annular edge 10A of the neck and a radially centered, axially elongated, reduced tubular portion 30 that extends downwardly within the annular portion 27 to a lower elevation below the top wall than the threaded portion 27A. Thus the annular portion has a bottom terminal annular edge 27B that is of a smaller axial spacing from the top wall than the tubular portion bottom frustoconical portion 30A is from the top wall.

The tubular portion is extendable in the plug bore 33 of the plug 14, is of a longer axial length than the plug, including its bore, and mounts a fluid seal 31, for example an O-ring 31 to form a fluid seal within the plug bore. The seal 31 is in greater axial spaced relationship to the top wall 29 than the opening of the holes 58 to the bottom annular chamber. The holes 58 open through the exterior peripheral surface of the main body to the ambient atmosphere. The lower annular portion threads extend axially further away from the top wall than the maximum axial spacing of the O-ring 31 from the top wall. The upper portion of the plug bore includes a frustoconical part 33A having a major base opening through the top surface 14A of the plug.

The main body bore 21 has a lower bore portion 21A that opens through the lower end of the tubular portion which forms the regulator inlet and an axial intermediate bore portion 21B that opens to a top, larger diameter bore portion 21C to form a valve seat 32. Advantageously, the main body, including its tubular portion 30, its annular portion 27 and its top portion 36 are one integrally unitary piece.

An annular bonnet (cap) B has a bore 35 extending axially therethrough with the bore including a lower enlarged diametric bore portion 35A that is threaded to the reduced diameter threaded end portion 36 of the main body to provide a control chamber 54. The bonnet also includes a top enlarged diameter bore portion 35B that, through a frustoconical portion 35D opens to the bonnet top, reduced diameter bore portion 35C. The top of bore portion 35B and its opening to the major base of the frustoconical portion form an annular shoulder 38. The bore portion 35C opens to a regulator outlet 50 which forms part of the bore 35 and can be connected to suitable conventional apparatus 19 where pressurized fluid under a reduced, preselected pressure is desired for operation.

Mounted in the control chamber 54 for limited axial movement is a piston X that has a top enlarged diametric portion (head) 39 in fluid sealing relationship with bonnet enlarged diametric bore portion 35B. The bonnet has a vent hole 52 opening to the bonnet bore axially between the piston enlarged diametric portion and the top of the main body. The piston has an axially elongated sleeve (stem) 40 that extends downwardly from the piston head, including within the main body bore portion 21C, and a valve insert 51 mounted to the stem for being abuttable against the valve seat for blocking fluid flow through the main body bore 21. It is to be understood that instead of providing an insert, the bottom part of the valve stem may be of an exterior shape that would be the same as the exterior shape of the combination of the insert 51 and stem 40 for seating against the valve seat. The lower end portion 40A of the piston stem 40 is of a reduced diameter to in combination with the valve insert 51 and the body wall forming bore portion 21C, provide a valve chamber 42 to which the valve seat opens. At least part of the piston stem above the stem reduced diameter part extends with the bore portion 21C in both of the piston valve open and closed positions. Further the piston stem 40 has cross apertures 43 that open to the valve chamber and to the piston passage 44 which, at its opposite end, opens through the top of the piston radially adjacent to the shoulder 38. A coil spring 45 acts between the top of the main body and the bottom of the piston head to constantly urge the piston to a valve open position. Thus, when the pressure at the outlet 50 drops below a preselected level, the piston is resiliently moved to it open position to permit fluid flow from the inlet (lower part of bore portion 21A) to the top part of control chamber which is above the piston head, but when the pressure at the outlet is at or above the preselected level, the piston moves against the action of the spring 45 to a closed position, or is retained by the pressure in the top portion of the control chamber blocking fluid flow through the main body bore.

The main body has two passages 55 opening to the main body bore axially intermediate the body wall 29 and the valve seat for mounting conventional pressure relief devices 57 to the main body in fluid communication with the passages 55 to vent to the ambient atmosphere in the event the pressure in the body bore becomes excessive. Further, the main body holes 58 open to the ambient atmosphere and to the lower annular chamber 25 to be above the top annular edge 10A of the cylinder neck even when the main body is threaded to the neck to an extent the lower end of the tubular portion abuts against the imperforated rupture disk 12 without rupturing the disk, the tubular portion 30 at this time being in fluid sealing relationship with the plug. However, when the main body is threaded to have the wall 29 abut against the neck top edge 10A, the holes 58 open to the neck threaded portion and the main body tubular lower end portion 30A has ruptured the disk to extend to a lower elevation than the disk. Advantageously, the outer peripheral surface of the lower end portion 30A may be of a frustoconical shape with its minor base being below its major base to facilitate rupturing the disk. The rupturing (perforating) of the disk permits the pressurized fluid in the cylinder flowing to the valve seat. At this time the main body tubular portion 30 is still in fluid sealing relationship with the plug.

The spring 45 is selected to move the piston to a valve open position upon the pressure in the outlet 50 decreasing below a preselected level. With the disk having been ruptured and the regulator in the valve open position, there is a fluid flow path from the cylinder to the main body bore portion 21A, through the valve seat 32 to the chamber 42, thence to the cross bore 43 and through piston bore portion 44 to the control chamber to be above the piston and thence through bonnet bore portion 35C to the outlet 50. The movement of the piston axially away from the valve seat is limited by abutting against the shoulder 38.

The threaded portions of the lower annular portion and the neck are of axial dimensions that when the plug device is threaded to the neck sufficiently to have the tubular portion abut against the disk, the holes 58 open to the annular chamber above the neck while the seal 31 is axially between the upper frustoconical part 33A of the plug bore and the disk to prevent the escape of fluid between the tubular portion and the wall of plug defining the plug bore and when the top wall abuts against the neck top annular edge 10A, the fluid seal 31 is between the plug frustoconical part 33A and lower end of the plug bore to prevent the escape of fluid between the tubular portion and the wall of plug defining the plug bore. The main body lower threaded portion 27A is of an axial length that when unthreading the regulator from the cylinder to have the fluid seal 31 enter into the upper frustoconical part 33A of the plug bore whereby fluid can escape between the plug bore 33 and the tubular portion to flow through the holes 58 to the ambient atmosphere while the main body is sufficiently threaded to the neck to prevent the regulator being blown off the cylinder by the fluid pressure in the cylinder acting against the main body. This provides a safety feature in that excessive flow through the holes indicates that there is sufficient pressure in the cylinder that the removal of the regulator should be stopped or other precautionary measures taken. With reference thereto, it is noted that the fluid seal 31 is below the frustoconical part 33A when the tubular portion 30 is abutting against the disk prior to rupturing the disk and the seal 17 is below the clip ring 15.

What is claimed is:

1. A pressure reducing regulator that has a central axis and is threadable to a cylinder neck portion which has a top annular edge, comprising a main body having a lower annular chamber that at least in part is defined by a top annular wall, a radial outer annular portion extending axially below the annular wall, surrounding the top annular wall and being internally threaded and a radial centered reduced diameter portion extending to a lower elevation than the annular portion, and a main body top portion; the main body having a bore extending axially therethrough, including through the body reduced diameter portion and through the main body top portion, the main body bore having a top bore portion and a lower bore portion having a part providing an inlet and a part of a smaller diameter than the top bore portion and opening thereto to provide a valve seat, a cap having an outlet and connected to the main body top portion to in conjunction therewith provide a control chamber that at least in part is defined by an internal wall surface portion and includes a control chamber top portion opening to the outlet, and a piston axially movable in the control chamber and having a piston head in fluid sealing relationship with the wall surface portion, the piston having an fluid passage that opens through the piston head to the control chamber top portion and to the valve seat, the piston being movable in the control chamber between an open position permitting fluid flow through the valve seat from the inlet to the outlet when the fluid pressure at the outlet falls below a preselected level and a closed position that at least one of the piston and an insert mounted to the piston abuts against the valve seat to block fluid flow to the piston passageway when the pressure at the outlet is at least a preselected valve and means for resiliently urging the piston to its open position when the pressure at the outlet falls below the preselected level.

2. The pressure regulator of claim 1 wherein the main body reduced diameter portion extends axially downwardly below the top wall a greater distance than the axial dimension of the annular portion.

3. The pressure regulator of claim 1 wherein the annular portion has a lower terminal annular edge below the top wall, an exterior annular surface and a hole opening through the exterior surface and to the lower annular chamber more closely adjacent to the top wall than the lower terminal edge.

4. The pressure regulator of claim 1 wherein the reduced diameter portion has a fluid seal member extending therearound that is axially spaced from the top wall.

5. The pressure reducing regulator of claim 1 wherein the main body has an exterior surface, the annular portion has a lower terminal annular edge below the top wall, a hole opening through the exterior surface and to the lower annular chamber more closely adjacent to the top wall than the lower terminal edge, a fluid passageway opening through the exterior surface and to the main body bore axially between the valve seat and the top wall and a pressure relief device mounted to the main body in fluid communication with the fluid passageway.

6. A pressure reducing regulator that has a central axis and is mountable to a cylinder for containing fluid under high pressure that has an externally threaded neck with a top annular edge and a plug device mounted in the neck which includes a plug having an bore extending therethrough and a rupturable disk mounted to the plug for blocking fluid flow through the plug bore, comprising a main body having a lower annular chamber that at least in part is defined by a top annular wall, a radial outer annular portion extending below the top annular wall, surrounding the top annular wall and being internally threaded for being threaded to the neck and a radially centered, axially extending reduced diameter tubular portion that is extendable in the plug bore in fluid sealing relationship therewith and is abuttable against the disk while the disk remains imperforated when the annular portion is threaded to the neck with the top wall spaced from the neck, a top portion having a top surface axially above the top wall and a main body bore extending axially through the tubular portion and the top portion and providing a valve seat, a cap mounted to the main body to in combination therewith provide a control chamber to have the main body bore open thereto, said cap having an outlet opening to the control chamber, a piston extending in the control chamber, having an enlarged diametric head in fluid sealing relationship with one of the cap and main body and being axially movable in the control chamber between a closed position blocking fluid flow through the valve seat and an open position, the piston in combination with the main body bore providing a valve chamber having the valve seat opening thereto and a passageway that opens to the valve chamber and the control chamber intermediate the piston head and the outlet and means for moving the piston from its closed position to its open position when the pressure at the outlet falls below a preselected value, the annular portion having a bottom annular edge that is axially spaced from the top wall a shorter axial distance than the maximum axial spacing of the tubular portion from the top wall.

7. A pressure reducing regulator having a central axis that is mountable to a cylinder having pressurized fluid therein wherein the cylinder has a threaded neck portion that has a top annular edge and a plug device retained in the neck portion with the plug device having a plug mounted in the neck, the plug having a bottom portion and a bore extending axially therethrough, and a rupturable disk mounted to the plug bottom portion to block fluid flow through the plug bore, comprising a main body having a lower annular chamber that at least in part is defined by a top annular wall, a radial outer annular portion extending below the top annular wall, surrounding the top annular wall and being internally threaded for being threaded to the neck and a radially centered, axially extending reduced diameter tubular portion that is extendable in the plug bore in fluid sealing relationship therewith and is abuttable against the disk while the disk remains imperforated when the annular portion is threaded to the neck with the top wall axially spaced from the neck, a top portion having a top surface axially above the top wall and a main body bore extending axially through the tubular portion and the top portion and providing a valve seat, a cap mounted to the main body to in combination therewith provide a control chamber to have the main body bore open thereto, said cap having an outlet opening to the control chamber, a piston extending in the control chamber, having an enlarged diametric head in fluid sealing relationship with one of the main body and the cap and being axially movable in the control chamber between a closed position blocking fluid flow through the valve seat and an open position, the piston in combination with the main body bore providing a valve chamber having the valve seat opening thereto and a passageway that opens to the valve chamber and the control chamber intermediate the piston head and the outlet and means for resiliently acting against the piston to urge it to one of its positions, the annular portion having an exterior surface and a hole opening through the exterior surface and to the annular chamber axially between the neck and the top wall when the main body is threaded to the neck with the rupturable disk remaining imperforated.

8. A pressure reducing regulator that has a central axis and is mountable to a cylinder for containing fluid under high pressure that has an externally threaded neck with a top annular edge and a plug device mounted in the neck which includes a plug having an bore extending therethrough and a rupturable disk mounted to the plug for blocking fluid flow through the plug bore, comprising a main body having a lower annular chamber that at least in part is defined by a top annular wall, a radial outer annular portion extending below the top annular wall, surrounding the top annular wall and being internally threaded for being threaded to the neck and a radially centered, axially extending reduced diameter tubular portion that is extendable in the plug bore in fluid sealing relationship therewith and is abuttable against the disk while the disk remains imperforated when the annular portion is threaded to the neck with the top wall spaced from the neck, a top portion having a top surface axially above the top wall and a main body bore extending axially through the tubular portion and the top portion and providing a valve seat, a cap mounted to the main body to in combination therewith provide a control chamber to have the main body bore open thereto, said cap having an outlet opening to the control chamber, a piston extending in the control chamber, having an enlarged diametric head in fluid sealing relationship with one of the cap and main body and being axially movable in the control chamber between a closed position blocking fluid flow through the valve seat and an open position, the piston in combination with the main body bore providing a valve chamber having the valve seat opening thereto and a passageway that opens to the valve chamber and the control chamber intermediate the piston head and the outlet and means for moving the piston from its closed position to its open position when the pressure at the outlet falls below a preselected value, the annular portion having a bottom annular edge, an exterior surface and a hole opening through the exterior surface and to the annular chamber axially more closely adjacent to the top wall than the bottom annular edge.

9. The pressure reducing regulator of claim 8 wherein the neck and the annular portion have threads of axial dimensions that the tubular portion is abuttable against the disk while the disk remains imperforated and the hole opens to the annular chamber above the neck when the annular portion is threaded to the neck.

10. The pressure reducing regulator of claim 8 wherein the neck and the annular portion have threads of axial dimensions that when the top wall is abutting against the neck, the tubular portion extends through the disk and the hole opens to the annular chamber below the neck top annular edge.

11. The pressure reducing regulator of claim 8 wherein main body has an exterior surface and a fluid passageway opening through the exterior surface and to the main body bore axially between the valve seat and the annular chamber top wall and a pressure relief device is mounted the main body in fluid communication with the fluid passageway.

12. A pressure reducing regulator having a central axis that is mountable to a cylinder having pressurized fluid therein wherein the cylinder has a threaded neck portion that has a top annular edge and a plug device retained in the neck portion with the plug device having a plug mounted in the neck, the plug having a bottom portion and a bore extending axially therethrough, and a rupturable disk mounted to the plug bottom portion to block fluid flow through the plug bore, comprising a main body having a lower annular chamber that at least in part is defined by a top annular wall, a radial outer annular portion extending below the top annular wall, surrounding the top annular wall and being internally threaded for being threaded to the neck and a radially centered, axially extending reduced diameter tubular portion that is extendable in the plug bore in fluid sealing relationship therewith and is abuttable against the disk while the disk remains imperforated when the annular portion is threaded to the neck with the top wall axially spaced from the neck, a top portion having a top surface axially above the top wall and a main body bore extending axially through the tubular portion and the top portion and providing a valve seat, a cap mounted to the main body to in combination therewith provide a control chamber to have the main body bore open thereto, said cap having an outlet opening to the control chamber, a piston extending in the control chamber, having an enlarged diametric head in fluid sealing relationship with one of the main body and the cap and being axially movable in the control chamber between a closed position blocking fluid flow through the valve seat and an open position, the piston in combination with the main body bore providing a valve chamber having the valve seat opening thereto and a passageway that opens to the valve chamber and the control chamber intermediate the piston head and the outlet and means for resiliently acting against the piston to urge it to one of its positions, the annular portion having an exterior surface and a hole opening through the exterior surface and to the annular chamber axially between the neck and the top wall when the main body is threaded to the neck with the rupturable disk remaining imperforated.

13. A pressure reducing regulator having a central axis that is mountable to a cylinder having pressurized fluid therein wherein the cylinder has a threaded neck portion that has a top annular edge and a plug device retained in the neck portion with the plug device having a plug mounted in the neck, the plug having a bottom portion and a bore extending axially therethrough, and a rupturable disk mounted to the plug bottom portion to block fluid flow through the plug bore, comprising a main body having a lower annular chamber that at least in part is defined by a top annular wall, a radial outer annular portion extending below the top annular wall surrounding the top annular wall and being internally threaded for being threaded to the neck and a radially centered, axially extending reduced diameter tubular portion that is extendable in the plug bore in fluid sealing relationship therewith and is abuttable against the disk while the disk remains imperforated when the annular portion is threaded to the neck with the top wall axially spaced from the neck, a top portion having a top surface axially above the top wall and a main body bore extending axially through the tubular portion and the top portion and providing a valve seat, a cap mounted to the main body to in combination therewith provide a control chamber to have the main body bore open thereto, said cap having an outlet opening to the control chamber, a piston extending in the control chamber, having an enlarged diametric head in fluid sealing relationship with one of the main body and the cap and being axially movable in the control chamber between a closed position blocking fluid flow through the valve seat and an open position, the piston in combination with the main body bore providing a valve chamber having the valve seat opening thereto and a passageway that opens to the valve chamber and the control chamber intermediate the piston head and the outlet and means for resiliently acting against the piston to urge it to one of its positions, the annular portion having an exterior surface and a hole opening through the exterior surface and to the annular chamber, the plug having a top surface, the fluid sealing relationship between the tubular portion and the plug bore being provided by a fluid seal mounted to the tubular portion, the plug bore having a frustoconical portion axially intermediate the fluid seal and the plug top surface with its major base opening to the plug top surface while the tubular portion abuts against the disk and the disk remains imperforated, and after the disk has been perforated by sufficiently threading the main body on the neck, upon sufficiently unthreading the main body from the neck to have the fluid seal extending within the frustoconical portion, permit fluid from the cylinder flow into the annular chamber and through the hole to the ambient atmosphere while the main body is still threadingly retained on the neck.

14. The pressure reducing regulator of claim 13 wherein the tubular portion extends further axially away from the top wall than the annular portion.

15. A pressure reducing regulator that has a central axis and is threadable to a cylinder neck portion which has a top annular edge, comprising a main body having a lower annular chamber that at least in part is defined by a top annular wall, a radial outer annular portion extending axially below the annular wall, surrounding the top annular wall and being internally threaded for being threaded to the neck portion and a radial centered reduced diameter portion extending below the top annular wall, and a main body top portion; the main body having a bore extending axially therethrough, including through the body reduced diameter portion and through the main body top portion, the main body bore having a top bore portion and a lower bore portion having a part providing an inlet and a part of a smaller diameter than the top bore portion and opening thereto to provide a valve seat, a cap having an outlet and connected to the main body top portion to in conjunction therewith provide a control chamber that at least in part is defined by an internal wall surface portion and includes a control chamber top portion opening to the outlet, and a piston axially movable in the control chamber and having a piston head in fluid sealing relationship with the wall surface portion, the piston having an fluid passage that opens through the piston head to the control chamber top portion and to the valve seat, the piston being movable in the control chamber between an open position permitting fluid flow through the valve seat from the inlet to the outlet when the fluid pressure at the outlet falls below a preselected level and a closed position that at least one of the piston and an insert mounted to the piston abuts against the valve seat to block fluid flow to the piston passageway when the pressure at the outlet is at least a preselected valve and means for resiliently urging the piston to its open position when the pressure at the outlet falls below the preselected levels, the main body having an external surface, a bottom annular edge and a hole opening through the exterior surface and to the annular chamber more closely adjacent to the top wall than the bottom annular edge, the main body being threadably mountable to the neck portion for having the hole opening to the annular chamber above the neck portion top annular edge and also is threadable to the neck portion that the opening of the hole through the annular portion to the annular chamber is below the neck portion top annular edge.

* * * * *